United States Patent Office 2,879,291
Patented Mar. 24, 1959

2,879,291

RECOVERY OF TEREPHTHALIC ACID

John H. Elliott, Newark, Del., assignor to Hercules Powder Company, Wilmington, Del., a corporation of Delaware No Drawing. Application December 28, 1956
Serial No. 631,033

15 Claims. (Cl. 260—525)

The present invention relates to a process for recovering alkali metal values and terephthalic acid from aqueous solutions of dialkali metal terephthalate.

There has recently been devised a process for the manufacture of terephthalic acid which is a practical utilization of the discovery that an alkali metal salt of benzoic acid, orthophthalic acid, or isophthalic acid can be transformed by heating at a relatively elevated temperature into the corresponding alkali metal salt of terephthalic acid. This method and its various modifications are described, among other publications, in Australian Patent No. 163,524; Belgium Patents 522,289; 524,035; 533,755; U.S. patent applications, Serial Nos. 392,512; 395,609; 449,266; and 472,245, all of which are now abandoned, to Bernhard Raecke; and in U.S. patent applications, Serial Nos. 472,246, now Patent No. 2,794,830 and 480,-620 by Bernhard Raecke et al., the disclosures of which are incorporated in this application by reference.

Still more recently, the above process has been extended to the manufacture of terephthalic acid from benzene carboxylic acids having three or more carboxyl groups. In U.S. patent application, Serial No. 582,087, by Schenk et al., filed May 2, 1956, for example, there is described the manufacture of terephthalic acid by a process which comprises heating an alkali metal salt of such acids as hemi-mellitic acid, trimellitic acid, trimesitinic acid, mellophanic acid, prehnitic acid, pyromellitic acid, benzene pentacarboxylic acid, and mellitic acid, as well as mixtures of such salts with themselves or with alkali metal salts of benzoic acid in the presence of a catalyst.

Summarizing briefly the prior art as above described, there is proposed a process for the manufacture of terephthalic acid in which the starting material is an alkali metal salt of a benzene carboxylic acid other than terephthalic acid. The alkali metal salts that can be used are those of lithium, potassium, sodium, rubidium, and cesium, with the most preferred salt being that of potassium. According to the process, the alkali metal salt of the starting benzene carboxylic acid is transformed in good yield to the corresponding alkali metal salt of terephthalic acid by heating to a high temperature in an atmosphere substantially free from oxygen. Benzene is also obtained as a by-product when the starting material is a salt of benzoic acid. The reaction temperature can vary from about 300° C. up to the decomposition temperature of the starting material or the desired reaction product but preferably is within the range of 340° C. to 500° C. The reaction can be carried out at any convenient pressure although a superatmospheric pressure is preferred. It is also preferred to carry out the reaction in the presence of a salt of zinc or cadmium to act as a catalyst and promote a higher yield of the desired dialkali metal terephthalate.

Also, according to the prior art, the reaction is carried out in a substantially oxygen-free inert atmosphere, this being achieved by the employment of an inert gas such as carbon dioxide, nitrogen, argon, ammonia, methane, carbon monoxide, or the like as an atmosphere for the reaction.

The material that is ultimately desired is not the dialkali metal salt of terephthalic acid but terephthalic acid itself. Therefore, it has been proposed to recover terephthalic acid by extracting the crude reaction product with water to form a solution of dialkali metal terephthalate and then precipitating terephthalic acid from the solution. The alkali metal content of such a solution is another important economic factor in the process and it is also desirable to recover the alkali metal in a form in which it can be reused for the production of dialkali metal terephthalate.

It is apparent from the previous discussion that any method for the recovery of terephthalic acid from an aqueous solution of dialkali metal terephthalate should also provide for recovery of alkali metal in order to possess the greatest possible economic advantages. It is, therefore, an object of the present invention to provide a process for the recovery of terephthalic acid from an aqueous solution of dialkali metal terephthalate in which the alkali metal is also recovered in a form in which it possesses greatest economic value.

According to the present invention, an aqueous solution of dialkali metal terephthalate is treated with sulfur dioxide to cause the precipitation of terephthalic acid and the formation of alkali metal bisulfite in the aqueous phase. The terephthalic acid is mechanically removed, for example by filtration or centrifugation, and the resulting aqueous solution of alkali metal bisulfite is heated in the presence of a benzene carboxylic acid other than terephthalic acid to effect the liberation of sulfur dioxide (which can be recovered and recycled) and the formation of an aqueous solution of an alkali metal salt of said benzene carboxylic acid. From the latter aqueous solution, dry alkali metal salt of the benzene carboxylic acid of a purity suitable for conversion into dialkali metal terephthalate by prior art techniques can be obtained by drying in any conventional manner.

By way of further explanation, the process of the invention includes two steps in which the following chemical reactions, using benzoic acid as illustrative in the second step, take place:

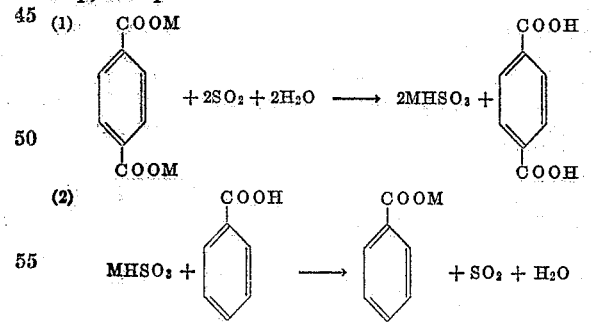

where M=alkali metal. The first step, which involves Reaction 1, is easily carried out by introducing gaseous sulfur dioxide into an aqueous solution of dialkali metal terephthalate of any convenient concentration until the sulfur dioxide ceases to be absorbed by the solution. The temperature at which this step of the process is carried out is widely variable but it is particularly convenient to carry out the reaction at normal room temperature. The reaction proceeds readily and at room temperature can be completed in a relatively short time, usually less than about two hours, provided the sulfur dioxide is introduced at a sufficient rate of flow. In this step, terephthalic acid is precipitated substantially quantitatively. The removal of the terephthalic acid by mechanical means, such as by filtration or centrifugation, leaves an aqueous phase containing alkali metal and bisulfite ions in solution.

The second step of the process, which involves Reaction 2, requires the addition of a benzene carboxylic acid other than terephthalic acid to the aqueous solution of alkali metal bisulfite in an amount at least stoichiometrically equivalent to the alkali metal bisulfite and necessitates heating to drive off sulfur dioxide. Even when heat is applied, however, the reaction involved in this step of the process is exceedingly slow, unless a relatively high temperature is employed, but can be accelerated by sparging the reaction mixture with an inert gas or by continuously removing water during the course of the reaction or by a combintaion of these two procedures.

In order to illustrate the invention in greater detail, the following examples are presented. Parts and percentages are by weight unless otherwise specified.

Example 1

In a reaction vessel equipped with an inlet tube and a reflux condenser was placed a solution of 100 parts of dipotassium terephthalate and 900 parts of water. Gaseous sulfur dioxide at a flow rate of about ½ volume per volume per minute was introduced through the inlet tube of the reaction vessel for 40 minutes at the end of which time the solution ceased to absorb sulfur dioxide. The reaction mixture at this point was a thick slurry which was filtered and the filter cake washed with about 300 parts of water. After being dried the filter cake was identified as terephthalic acid and amounted to 68.2 parts and was found to have an acid number of 673. This represents an approximate 99% recovery of terephthalic acid.

The filtrate and the wash water were combined and found to contain by iodometric analysis 61 parts of sulfur dioxide (as potassium bisulfite). The combined wash water and filtrate amounted to about 1340 parts.

The solution of potassium bisulfite obtained as above was concentrated by evaporation and a portion of the solution amounting to 396.5 parts and containing 50.2 parts of sulfur dioxide (as potassium bisulfite) was placed in a reaction vessel equipped with an agitator and a gas inlet tube extending to the bottom of the vessel. To this solution there was added 20 parts of benzoic acid and the solution was heated to 95–100° C. while simultantaneously being agitated vigorously and sparged with nitrogen at a rate of about 6 volumes per volume per minute. Additional benzoic acid was added periodically. The reaction mixture was also sampled periodically and the sulfur dioxide content determined iodometrically. The following data were obtained:

| Elapsed Time (hrs.) | Amount Benzoic Acid Added (parts) | $SO_2$ Concentration (parts) | Percent $SO_2$ Evolved |
|---|---|---|---|
| 0 | 20 | | |
| 0.4 | 20 | 37.7 | 24.9 |
| 0.5 | 20 | | |
| 1.0 | 20 | 22.7 | 54.8 |
| 2.0 | 10 | 14.0 | 72.2 |
| 3.25 | | 9.10 | 81.9 |
| 4.0 | 10 | 7.30 | 85.5 |
| 7.75 | | 2.45 | 95.3 |
| 8.5 | 10 | | |
| 9.0 | | 1.40 | 97.4 |

At the end of the reaction the solution remaining in the reaction vessel was identified as essentially an aqueous solution of potassium benzoate containing some free benzoic acid. Dry potassium benzoate was obtained by spray-drying this solution.

Example 2

In this example an aqueous solution of potassium bisulfite was obtained in a manner similar to that of Example 1. The solution amounted to about 397.5 parts and contained 51.0 parts of sulfur dioxide (as potassium bisulfite). One hundred parts of benzoic acid was added to the solution and the reaction was carried out as before employing a sparge of nitrogen at the rate of about 3 volumes per volume per minute. This time, however, the reaction mixture was heated to boiling (100–110° C.) and water was allowed to distill freely from the reaction as it progressed. The following data were obtained:

| Elapsed Time (hrs.) | Amount $SO_2$ Evolved (parts) | Amount Water Distilled (parts) | Percent $KHSO_3$ Reacted |
|---|---|---|---|
| 0 | (100 parts benzoic acid added to $KHSO_3$) | | |
| 0.5 | 28.2 | 31.8 | 55.4 |
| 1.0 | 40.5 | 140.5 | 79.5 |
| 1.25 | (10 parts benzoic acid added to $KHSO_3$) | | |
| 1.5 | 42.0 | 232.0 | 82.5 |
| 2.5 | 45.2 | 282.8 | 88.6 |
| 3.5 | 47.6 | 283.4 | 93.3 |

It can be seen from this example that the evaporation of water in addition to the sparging of the reaction mixture with nitrogen materially accelerated the reaction.

Example 3

The procedure of Example 1 was followed with the exception that an aqueous solution of disodium terephthalate was employed as the starting material. Essentially equivalent results were obtained.

Example 4

In this example an aqueous solution of potassium bisulfite was obtained in the manner of Example 1. The solution amounted to 399 parts and contained 99 parts of potassium bisulfite. This solution was heated to 95–100° C. and stirred vigorously while sparging with nitrogen at a rate of about 5 volumes per volume per minute. Over the course of 8 hours, 61 parts of phthalic anhydride was added in 5 to 10 portions so that an excess of phthalic anhydride was continually present. After a total time of about 12 hours, 99% of the theoretical amount of sulfur dioxide had evolved from the reaction leaving essentially a solution of dipotassium phthalate.

The examples have illustrated the invention with respect to the recovery of terephthalic acid and alkali metal values from aqueous solutions of dipotassium terephthalate and disodium terephthalate. Aqueous solutions of other dialkali metal salts of terephthalic acid, i.e., salts of rubidium, cesium, and lithium, can also be employed as starting materials.

As illustrated, the first step of the process is quite simple and requires nothing more than the introduction of sulfur dioxide into an aqueous solution of dialkali metal terephthalate. The solution can have any convenient concentration but preferably will contain no more than about 25% by weight of dialkali metal terephthalate since, if the concentration is higher than this, the slurry that forms upon the introduction of sulfur dioxide is too thick for convenient handling. From the practical standpoint, it is therefore preferred that the starting solution contain from about 5 to about 20% by weight of dialkali metal terephthalate.

The reaction involved in the first step of the process can be carried out, as already stated, at any convenient temperature. Normally, room temperature is utilized for obvious reasons but higher or lower temperatures ranging preferably from about 0 to 100° C. can be utilized if desired. As has been demonstrated, the reaction is relatively rapid and free from any major complications. It is conveniently terminated when sulfur dioxide ceases to be absorbed at which time the precipitation of terephthalic acid is substantially complete.

Following the removal of terephthalic acid by mechanical means, the second step of the process is carried out by adding a benzene carboxylic acid other than terephthalic acid to the aqueous solution of alkali metal bisulfite that has been formed in the first step of the process and then heating to cause the evolution of sulfur dioxide. As has been shown in the examples, however, all of the benzene carboxylic acid need not be added initially since it can also be added stepwise during the course of the reaction. The amount of benzene carboxylic acid that is added is at least stoichiometrically equivalent to the alkali metal bisulfite but much more preferably will be at least about 5% in excess of the amount stoichiometrically required. Such an excess is desirable for a plurality of reasons among which is the fact that a small proportion of the benzene carboxylic acid sublimes and, if a sparge is used, is carried off by the inert gas. Still another reason is that an excess of benzene carboxylic acid provides a faster reaction, particularly in the case of di- or higher carboxylic acids such as phthalic acid. Any excess acid can, if desired, be neutralized following the reaction by treatment with alkali metal hydroxide to form additional reactant for conversion into dialkali metal terephthalate.

As mentioned, the reaction mixture in the second step of the process must be heated and in general the higher the temperature the faster the reaction will take place. A preferred temperature for use in this step is from about 80° C. up to the boiling point of the reaction mixture. By the expedient of employing superatmospheric pressure, the boiling point, of course, can be raised and temperatures up to about 300° C. are commercially feasible.

As the examples have shown, it is helpful to sparge the reaction mixture in the second step of the process with an inert gas. Nitrogen has been shown as useful for this purpose but other inert gases such as carbon dioxide, argon, and the like behave equivalently since the action of the gas is simply that of a physical aid to the removal of sulfur dioxide. The reaction is also accelerated by removing water during the course of the reaction in order to maintain a relatively high concentration of bisulfite ions. Removal of water can be accomplished conveniently simply by boiling the reaction mixture and allowing water vapor to escape along with sulfur dioxide.

The sulfur dioxide that is evolved in the second step of the reaction can be recovered by obvious means and recycled to the first step of the process when it is desired to carry out the process in a cyclic manner.

What I claim and desire to protect by Letters Patent is:

1. The cyclic process for the recovery of terephthalic acid and alkali metal values from an aqueous solution of dialkali metal terephthalate which comprises introducing sulfur dioxide into an aqueous solution of dialkali metal terephthalate whereby terephthalic acid is precipitated in substantially quantitative yield, mechanically separating said terephthalic acid, heating the resulting aqueous solution of alkali metal bisulfite in the presence of a benzene carboxylic acid other than terephthalic acid thereby liberating sulfur dioxide and forming an alkali metal salt of said benzene carboxylic acid in solution, and recycling the liberated sulfur dioxide to the first step of the process.

2. The process of claim 1 in which the benzene carboxylic acid is benzoic acid.

3. The process of claim 1 in which the benzene carboxylic acid is phthalic acid.

4. The cyclic process for the recovery of terephthalic acid and alkali metal values from an aqueous solution of dialkali metal terephthalate which comprises introducing sulfur dioxide into an aqueous solution of dialkali metal terephthalate whereby terephthalic acid is precipitated in substantially quantitative yield, mechanically separating said terephthalic acid, heating the resulting aqueous solution of alkali metal bisulfite in the presence of a benzene carboxylic acid other than terephthalic acid while simultaneously sparging with an inert gas thereby liberating sulfur dioxide and forming an alkali metal salt of said benzene carboxylic acid in solution, and recycling the liberated sulfur dioxide to the first step of the process.

5. The process of claim 4 in which the benzene carboxylic acid is benzoic acid.

6. The process of claim 4 in which the benzene carboxylic acid is phthalic acid.

7. The cyclic process for the recovery of terephthalic acid and alkali metal values from an aqueous solution of dialkali metal terephthalate which comprises introducing sulfur dioxide into an aqueous solution of dialkali metal terephthalate whereby terephthalic acid is precipitated in substantially quantitative yield, mechanically separating said terephthalic acid, heating the resulting aqueous solution of alkali metal bisulfite in the presence of a benzene carboxylic acid other than terephthalic acid while simultaneously evaporating water thereby liberating sulfur dioxide and forming an alkali metal salt of said benzene carboxylic acid in solution, and recycling the liberated sulfur dioxide to the first step of the process.

8. The process of claim 7 in which the benzene carboxylic acid is benzoic acid.

9. The process of claim 7 in which the benzene carboxylic acid is phthalic acid.

10. The cyclic process for the recovery of terephthalic acid and alkali metal values from an aqueous solution of dialkali metal terephthalate which comprises introducing sulfur dioxide into an aqueous solution of dialkali metal terephthalate whereby terephthalic acid is precipitated in substantially quantitative yield, mechanically separating said terephthalic acid, heating the resulting aqueous solution of alkali metal bisulfite in the presence of a benzene carboxylic acid other than terephthalic acid while simultaneously sparging with an inert gas and evaporating water thereby liberating sulfur dioxide and forming an alkali metal salt of said benzene carboxylic acid in solution, and recycling the liberated sulfur dioxide to the first step of the process.

11. The process of claim 10 in which the benzene carboxylic acid is benzoic acid.

12. The process of claim 10 in which the benzene carboxylic acid is phthalic acid.

13. The cyclic process for the recovery of terephthalic acid and potassium values from an aqueous solution of dipotassium terephthalate which comprises introducing sulfur dioxide into an aqueous solution of dipotassium terephthalate whereby terephthalic acid is precipitated in substantially quantitative yield, mechanically separating said terephthalic acid, heating the resulting aqueous solution of potassium bisulfite in the presence of a benzene carboxylic acid other than terephthalic acid thereby liberating sulfur dioxide and forming potassium salt of said benzene carboxylic acid in solution, and recycling the liberated sulfur dioxide to the first step of the process.

14. The process of claim 13 in which the benzene carboxylic acid is benzoic acid.

15. The process of claim 13 in which the benzene carboxylic acid is phthalic acid.

References Cited in the file of this patent

UNITED STATES PATENTS

| 2,749,362 | Berni | June 5, 1956 |
|---|---|---|

FOREIGN PATENTS

| 644,707 | Great Britain | Oct. 18, 1950 |
| 695,170 | Great Britain | Aug. 5, 1953 |
| 524,035 | Belgium | Nov. 30, 1953 |